United States Patent [19]

Chiou

[11] 4,278,845
[45] Jul. 14, 1981

[54] TELEPHONE INDEX FOR AUTOMATIC DIALING

[76] Inventor: Suchi Chiou, 5th fl., No. 14, Lane 180, Ho-Chiang St., Taipei, Taiwan

[21] Appl. No.: 67,758

[22] Filed: Aug. 20, 1979

[51] Int. Cl.³ .............................................. H04M 1/274
[52] U.S. Cl. ................................ 179/90 B; 179/90 CS; 340/365 VL
[58] Field of Search ............ 179/90 B, 90 BD, 90 CS; 340/153, 365 VL, 365 S, 147 A

[56] References Cited

U.S. PATENT DOCUMENTS

| | | | |
|---|---|---|---|
| 2,995,726 | 8/1961 | Rickard | 340/153 |
| 3,531,599 | 9/1970 | Bodie | 179/90 BD |
| 3,728,490 | 4/1973 | Nowicki | 179/6.3 R |
| 3,792,203 | 2/1974 | Martin | 179/90 B |
| 3,885,108 | 5/1975 | Zock | 179/90 B |
| 4,052,570 | 10/1977 | Sutton | 179/90 B |
| 4,164,630 | 8/1979 | Brodbeck | 179/90 CS |
| 4,178,487 | 12/1979 | Lake et al. | 179/90 B |

*Primary Examiner*—Gerald L. Brigance
*Attorney, Agent, or Firm*—Thompson, Birch, Gauthier & Samuels

[57] ABSTRACT

The invention relates to an improved telephone index for automatic dialing specially designed for use with a multi-purpose telephone set with microprocess apparatus. A card-selecting hook may be positioned so as to select a classified index card having the desired telephone number, and a sliding button may be depressed to open a cover plate over the card index to reveal a specific index card having the desired number. When the sliding button is depressed, momentary contact is made with individual contacts along the x-axis of the memory address key board. A button alongside the index card may then be depressed to complete the y-axis contact of the memory address key board. The desired telephone number stored in memory matrix may thus be automatically dialed using the micro-computor in the telephone set.

3 Claims, 8 Drawing Figures

TELEPHONE INDEX FOR AUTOMATIC DIALING

BACKGROUND OF THE INVENTION

The conventional electronic key telephone as disclosed by U.S. Pat. No. 4,164,630, has the capability to memorize and automatically dial many telephone numbers. In the memory, a telephone number is generally abbreviated as a two-digit number to represent the original number. However, if many numbers have to be memorized, three digits may be used. An index device is used to record the relationship between the original telephone numbers and their corresponding abbreviated numbers. The index device may be directly provided on the face of the telephone set. Several index cards can be overlapped to reduce their volume. Several selectors can be provided, each corresponding to a specific index card. When dialing a desired number, one first moves the card-selector to select a specific index card and then locates the desired number from that index card.

The present inventor has found many defects with the conventional apparatus. The present multi-purpose telephone set avoids many of the disadvantages of the conventional telephone index apparatus designed for automatic dialing.

Related Applications

U.S. Design Patent Application Ser. No. 021,260, filed Mar. 16, 1979 by the same inventor is directed to the external configuration of the telephone console of this invention. U.S. Utility Patent Application Ser. No. 083,334, filed Oct. 10, 1979 by the same inventor is directed to the internal circuitry of this invention.

SUMMARY OF THE INVENTION

The principal object of the present invention is to provide a multipurpose telephone set with index apparatus designed for automatic dialing in which a card selecting hook may be positioned so as to select a classified index card having the desired telephone number and a sliding button may be depressed to open a covering plate over the card index to reveal a specific index card having the desired number. When the sliding button is depressed, momentary contact is made with individual contacts along the x-axis of the memory address key board. A button alongside the index card may then be depressed to complete the y-axis contact of the memory address key board. The desired telephone number stored in the memory matrix may thus be automatically dialed using the micro-computor in the telephone set.

The telephone set of the present invention may be combined with a calculator, a clock, an alarm clock, a stop watch and other conventional means to form a multi-purpose telephone set with microprocess apparatus.

DESCRIPTION OF THE PREFERRED EMBODIMENT

Figure 1:
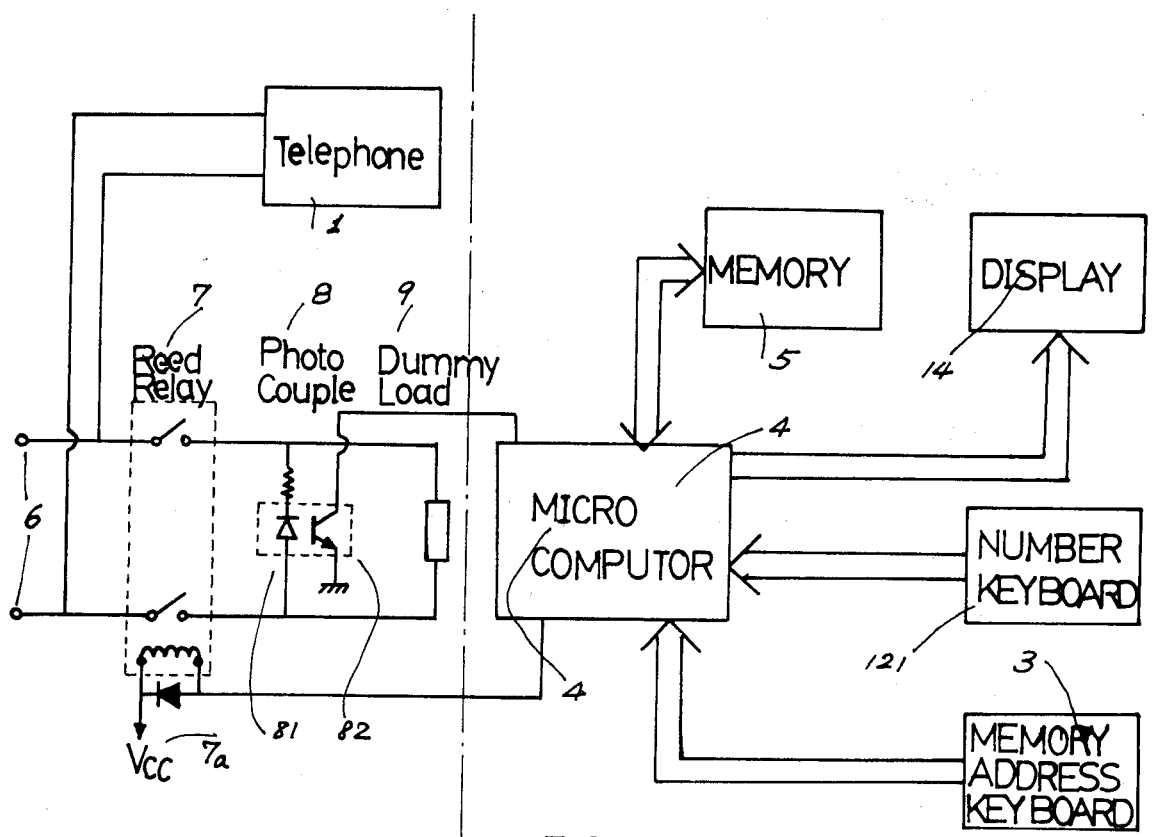
FIG. 1 is a circuit block diagram of the present invention.

As shown in FIG. 1, the telephone number to be memorized may be recorded in micro-computor 4 using key board 121. Said microcomputer will issue a dialing pulse or multi-frequency in activating reed relay 7 to automatically dial a telephone number. The telephone number will be stored in memory 5 of micro-computor 4 for future use.

Figure 2:
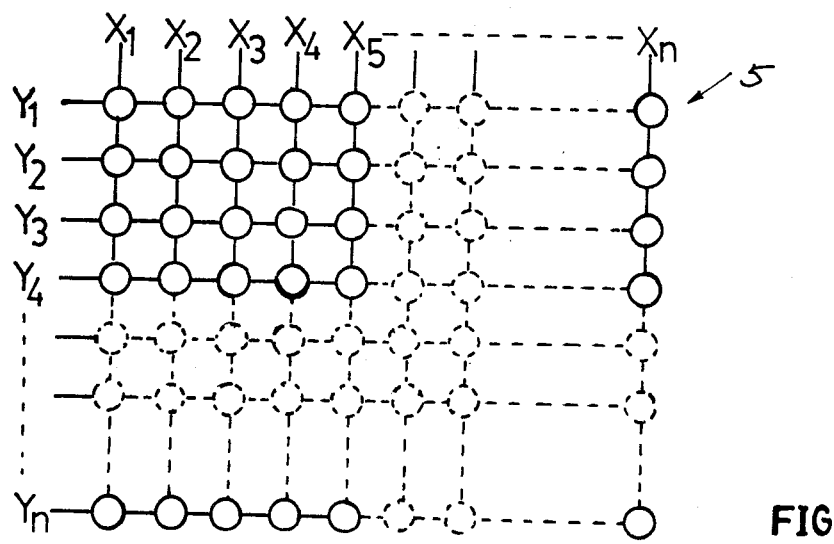
FIG. 2 is an illustration of the memory matrix of telephone numbers in accordance with the present invention.
Figure 3:
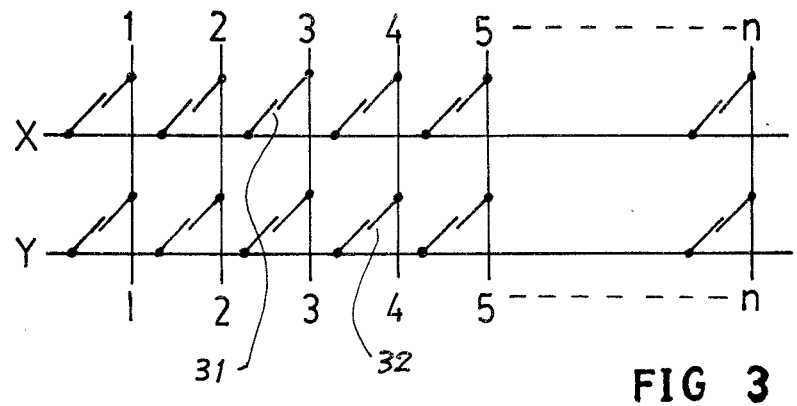
FIG. 3 is an illustration showing the x-axis and y-axis contacts within the memory address key board of the present invention.

The telephone number stored in memory 5 will also correspond to an address or matrix position as shown in the matrix of FIG. 2. The matrix address can be selected using memory address key board 3, for example by first depressing button 31 on the x-axis of FIG. 3 to contact x with 3 and then connecting the fourth button on the y-axis to contact y with 4. The memorized number at matrix address $x_3y_4$ will thus be selected. Said number is, in turn, processed through microcomputer 4 as shown in FIG. 1.

Figure 4:
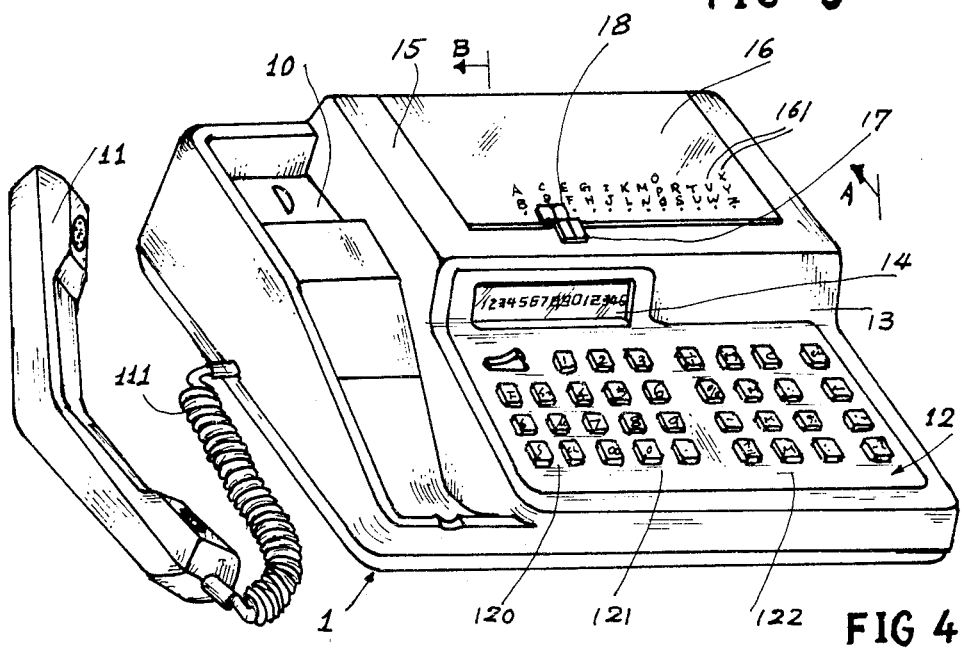
FIG. 4 is a perspective drawing of the telephone set of the present invention.

At left side of FIG. 4, a rest recess 10 is formed to cradle the hand set 11 which is connected to set 1 by cord 111. A key board 12 is positioned at the right side of FIG. 4 in which the left portion serves as a adjusting key board for use with a clock, alarm clock or stop watch 120. The middle portion of the key board serves as a telephone number key board 121 or as a key board for calculator use. The right side of key board 121 may be used for other functions such as calculator and timing operations.

The middle portion of set 1 is inclined upwards to provide a digital display 14. A platform 15 is formed atop said set 1 and is slightly inclined to its rear side. A cover plate 16 is provided on said platform 15.

Figure 5:
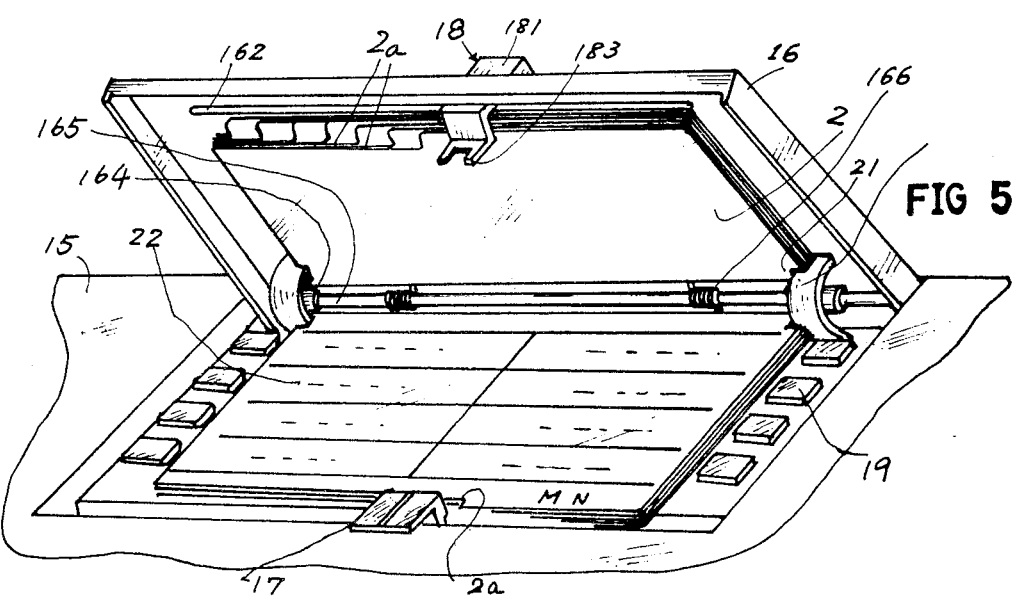
FIG. 5 is a perspective drawing of card index from direction A of FIG. 4.
Figure 6:
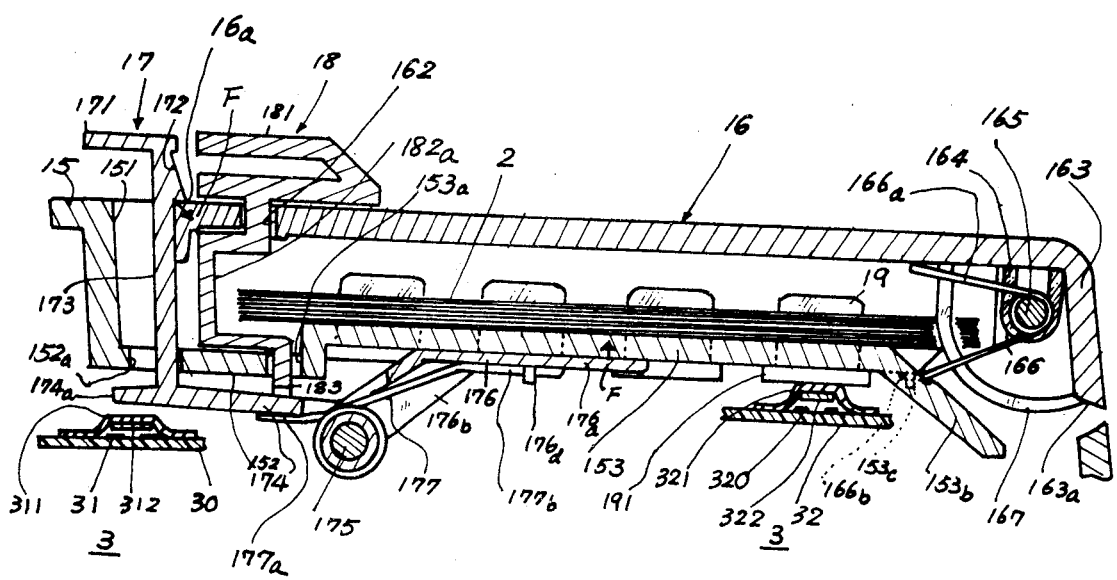
FIG. 6 is a partial sectional drawing of the present invention from direction B of FIG. 4.

Said cover plate 16 as shown in FIGS. 4, 5 and 6 is printed thereon with classification numbers or an alphabet 161, such as: AB, CD, . . . and XYZ. A slit 151 is provided on said platform 15 for engaging with the sliding button 17. Another slit 162 is provided on the cover plate 16 to engage with a card selecting hook 18.

The back portion of said cover plate 16 is bent to form an extension 163 which terminates with a sloping portion 163a at its lowest end. Two shaft brackets 164 are extended under said plate 16 for pivotedly inserting a horizontal shaft 165 which is mounted on the frame of the present telephone set. Two springs 166 are jacketed onto said shaft 165.

A horizontal plate 152 is extended from and under said platform 15. At its left side, a slit 152a is provided to pass said sliding button 17. A card supporting plate 153 is horizontally connected to said plate 152. A slit 153a is provided on said plate 153 to pass the card selecting hook 18. The end of said plate 153 is inclined outwards and downwards to form two sloping portions 153b for frictionally stopping the lower end 163a of said cover plate when opening said plate 16.

A spring bracket 153c is provided at the end of said supporting plate 153 to insert the lower end 166b of spring 166. Another end 166a of said spring stops at said plate 16.

As shown in FIGS. 5 and 6, several cards 2 are laid under the cover plate 16. Each card 2 is formed two cutting holes 21 on both sides thereof. Two arch plates 167 on both sides of the plate 16 serve to engage with said holes 21 on said card 2. Said card 2 is printed with several horizontal lines and is divided into two columns by a central partition. Each line on the two columns is printed with a telephone number and corresponding name 22. A button 19 is provided alongside each line number 22. Said button 19 passes through said plate 153. Its lower extension 191 floats on an elastic rubber 321. Each card 2 is also cut with a transverse cutting hole 2a on its front edge. The length of each hole 2a increases as the classification number subsequently proceeding. Thus, hole 2a on the uppermost card is shorter than that of each lower card.

Figure 7:
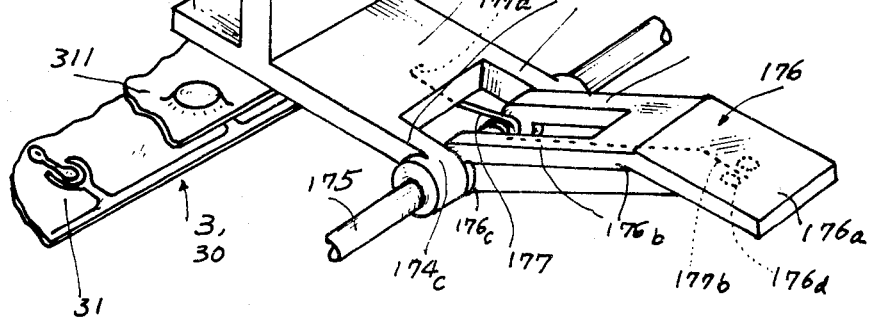
FIG. 7 is a perspective drawing of the card selecting hook of the present invention.

As shown in FIGS. 7 and 6, said sliding button 17 comprises a surface plate 171 on which a central line 171a is provided to coincide with the central line 181a on the surface plate 181 of said card selecting hook 18 so as to coincide with the classification 161 of telephone numbers on the cover plate 16. Said surface plate 171 is extended downwards to form a sloping portion 172, a hook portion 172a, and a vertical plate 173 which is finally connected with a horizontal plate 174 having a tongue extension 174a at one end thereof and a fork plate 174 at the other. Said fork plate 174 comprises two extended arms 174b each terminating in a shaft bracket 174c for pivotedly inserting a shaft 175 which is mounted on the frame of the telephone set. A sliding plate 176 which has an upper plate 176a slidably contacting the bottom of said card supporting plate 153 comprises two inclined arms 176b each terminating with a shaft bracket 176c for inserting said shaft 175.

A spring 177 is jacketed into said shaft 175 between the two shaft brackets 176c. One end 177a of the spring rests against horizontal plate 174. The other end 177b of spring 177 is fixed by two brackets 176d under plate 176a. Thus, a clamping force F as shown in FIG. 6 is exerted by said spring 177. One end 177a of spring 177 will tend to move the plate 174 and the hook 172a of said sliding button 17 thereby applying an opening pressure against the edge 16a of said cover plate 16. The other end 177b of spring 177 will pressurize the supporting plate 153 through the upper sliding plate 176a.

Figure 8:
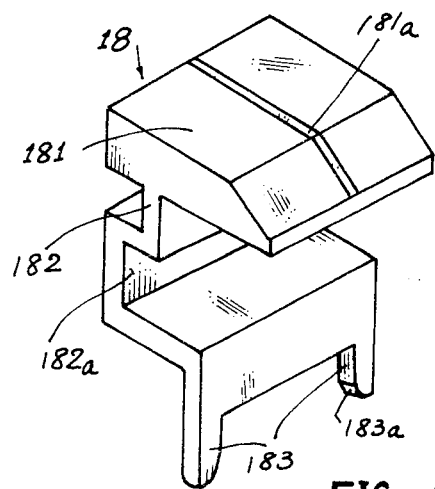
FIG. 8 is a perspective drawing of sliding button of the present invention.

The card selecting hook 18 as shown in FIG. 8 comprises an upper surface plate 181 on which a central line 181a is provided to coincide with the classification number 161 of plate 16. Said upper surface plate 181 extends downwards to connect a vertical plate 182 and a middle hook plate 182a and finally terminates with two vertical legs 183. The inner edge of each leg 183 is formed with an arch shape 183a for easily engaging the horizontal plate 174 of said sliding button 17. The middle hook plate 182a supports the index cards 2 as shown in FIG. 6.

As shown in FIGS. 6 and 7, a printed circuit board 30 is provided under the tongue extension 174a of said sliding button 17. Contacts 31 provided on printed circuit board 30 are covered with elastic rubber 311 having inner conducting plate 312. At the right side of FIG. 6, a button 19 is provided alongside each telephone number 22. Another printed circuit board 32 is provided under buttons 19. Said printed circuit board 32 includes contacts 320 which are covered with elastic rubber 321 having an inner conducting plate 322.

When using the present telephone set to automatically dial a number classified, for example, on card "MN", the card-selecting hook 18 is moved to the classification 161 printing the letters "MN". The sliding button 17, which is engaged with said selecting hook 18, is simultaneously moved to the specific classification "MN" along said shaft 175. By next depressing said button 17, the lower tongue extension 174a will depress to momentarily contact the corresponding contact 31 on the x-axis of the memory address in FIG. 3. At the same time, when, said button 17 is depressed to rotate counter-clockwise along shaft 175 so that its hook 172a no longer obstructs cover plate 16, as shown at 16a, said cover plate 16 will simultaneously be opened by the action of spring 166.

When moving the selecting hook 18 to the position "MN", the transverse cutting holes 2a on card "MN" and cards thereunder are lenthy enough to pass the hook plate 182a of said card selecting hook 18 so that said hook plate 182a will not engage and raise the index card "MN" and cards thereunder upon opening plate 16. The card "MN" is thus revealed. By depressing the button 19 alongside the desired telephone number 22, contact is made with contact 320 on the y-axis under button 19. The telephone number is thus selected from both the x and y-axis of the memory address in FIG. 3. The desired number will be automatically dialed through micro-computer 4 of the present invention.

By means of the present invention, telephone numbers may be located and automatically dialed faster, more easily and more conveniently than with prior art devices. The system of this invention has the capacity to memorize more telephone numbers than the conventional automatically dialing system. The compact and sophisticated construction makes the present invention more desirable and attractive than prior art devices.

One type of circuitry for the present invention is shown in FIG. 1 comprising: a telephone 1, a terminal from exchange line 6, a reed relay 7, a micro-computor 4, a memory part 5, a display 14, a number key board 121, and a memory address key board 3. The letter Vcc 7a represents a power source of direct circuit which is used to operate the present telephone set.

Another embodiment of the present invention comprises an additional circuit which may cancel an automatic redial order. Said additional circuit comprises a photo coupler 8 and a dummy load 9. Said photo coupler 8 further comprises a light emission diode (LED) 81 and a photo transistor 82. Said LED 81 of said photo coupler 8 is connected in parallel with said dummy load 9 and is positioned after reed relay 7. Said photo transistor 82 is used to transmit a grounding signal to said microcomputor 4 as LED 81 is being lit. Said dummy load 9 is used to substitute the load of the telephone circuit.

I claim:

1. In a telephone apparatus with memory-stored dialing data for automatic dialing comprising a housing having an entry keyboard switch means thereon for entering numbers to be stored and display means for displaying the number entered by said entry keyboard; multiple card index means for a visual listing of names and telephone numbers, each card including individual lines for individual numbers arranged in the same position on the cards, wherein said card and lines are divided into a plurality of left-hand lines and a plurality of right-hand lines being substantially equal in number, and further including a card-supporting place, a cover pivotally mounted over said cards, and a card-selecting hook freely engaging said cover for positioning an individual card for visual display of the card's content; card switch means including an individual contact associated with each card index; selector switch means including a left-hand and a right-hand series of push buttons with one button in said left-hand series for and adjacent to each of said left-hand lines and one button in said right-hand series for and adjacent to each of said right-hand lines so that said selector switch means is activated by a push button to close a circuit for a particular line positioned on an individual card to thereby complete a first circuit associated with the card contained data and close a second circuit associated with a particular line on a card to retrieve and automatically dial a telephone number stored at a location in the memory associated with said particular line; and a visual display panel means on said housing adjacent said cover for displaying the number dialed by actuating said card switch and selector switch; the improvement which comprises:

(a) said card-selecting hook comprises a surface plate, a vertical plate extending under said surface plate, a middle hook plate connecting said vertical plate and two legs extending downwards from said hook plate, said surface plate of said card-selecting hook including a center line which coincides with the classification of telephone numbers on said cover;

(b) further wherein said two legs which extend from said card-selecting hook freely engage a sliding button which is movingly engaged within a horizontal plate extending from said housing such that both the card-selecting hook and the sliding button may be moved simultaneously;

(c) said sliding button comprises a surface plate, a vertical plate with a hook connecting said surface plate and a horizontal plate connecting said vertical plate, said horizontal plate having a tongue extension at one end and another end which extends in two arms each terminating with a shaft bracket for pivotally inserting a horizontal shaft therein, a sliding plate which extends downwards in two arms each terminating with a shaft bracket for pivotally inserting said horizontal shaft, and a spring which is jacketed into said shaft having one end resting against said horizontal plate of said sliding button and the other end fixed on said sliding plate under said card-supporting plate such that said spring, acting by its one end to force said hook of said button to engage with the edge of said cover and acting by its other end to force said sliding plate to back against the bottom of said card-supporting plate, causes said cover plate to open as said sliding button is depressed; and (d) a printed circuit board comprising individual electrical contacts corresponding to each card in said card index is positioned under said tongue extension of said sliding button such that momentary electrical contact is made and the circuit is momentarily energized when said sliding button is depressed and at the same time said cover plate is opened.

2. In the telephone apparatus of claim 1, the further improvement wherein the rear edge of said card-supporting plate is inclined downwardly and outwardly so as to form a sloping portion to frictionally engage the back edge of said cover plate when said cover plate is opened.

3. In the telephone apparatus of claim 1, the further improvement wherein said multiple card index means comprises a plurality of index cards each cut with a transverse hole along its front edge, the length of each said hole increasing on adjacent cards from top to bottom such that the upper cards will be lifted by said card-selecting hook when the cover plate is opened thereby exposing the index card corresponding to the classification of telephone numbers on said cover as indicated by the position of the center line of said card-selecting hook.

* * * * *